United States Patent [19]

Wachi

[11] Patent Number: 4,539,666
[45] Date of Patent: Sep. 3, 1985

[54] APPARATUS FOR CONTROLLING ROTATION OF A RECORD DISK AT A CONSTANT LINEAR VELOCITY

[75] Inventor: Shigeaki Wachi, Higashikurume, Japan

[73] Assignee: Sony Corporation, Tokyo, Japan

[21] Appl. No.: 433,951

[22] Filed: Oct. 13, 1982

[30] Foreign Application Priority Data

Oct. 13, 1981 [JP] Japan .................. 56-163128

[51] Int. Cl.³ .................. G11B 23/00; G11B 27/10; G11B 7/00
[52] U.S. Cl. .................. 369/50; 369/59; 369/240
[58] Field of Search ............. 381/34; 371/42; 369/50, 369/240, 59, 133; 360/32; 358/261

[56] References Cited

U.S. PATENT DOCUMENTS 4,397,011  8/1983  Ogawa .................. 369/50

OTHER PUBLICATIONS

T. T. Doi, "General Information on a Compact Digital Audio Disc", J. Audio Eng. Soc., vol. 29, No. 1/2, 1981, Jan./Feb., pp. 60-66.
Doi et al., "A Long Play Digital Audio Disc System", J. Audio Eng. Soc., vol. 27, No. 12, [Dec. 1979], pp. 975-981.

*Primary Examiner*—Robert L. Richardson
*Attorney, Agent, or Firm*—Lewis H. Eslinger; Alvin Sinderbrand

[57] ABSTRACT

Apparatus for reproducing from a record disc a run length limited PCM audio signal comprises an optical transducer which reproduces the PCM audio signal from the record disc; a waveform shaping circuit for producing an output signal corresponding to the reproduced PCM audio signal and having portions of opposite polarities so that the output signal includes a plurality of transition intervals; a clock pulse generator for generating clock pulses having a constant frequency higher than the bit frequency of the output signal; a counter for detecting the period of each transition interval of the output signal by counting the number of clock pulses generated during each detected transition interval; a NAND gate for determining, during each of at least one predetermined period selected to be longer than the period $$\frac{\text{maximum transition interval}}{\text{minimum transition interval}} \times \text{one frame period},$$

if the number of the clock pulses counted by the counter during each detected transition interval in each longer predetermined period corresponds to a predetermined number of clock pulses included in the maximum transition interval which occurs when the record disc is rotating at a predetermined constant linear velocity, and for producing a velocity control signal in response thereto; and a drive circuit for controlling rotation of the record disc at the predetermined constant linear velocity in response to the velocity control signal.

12 Claims, 20 Drawing Figures

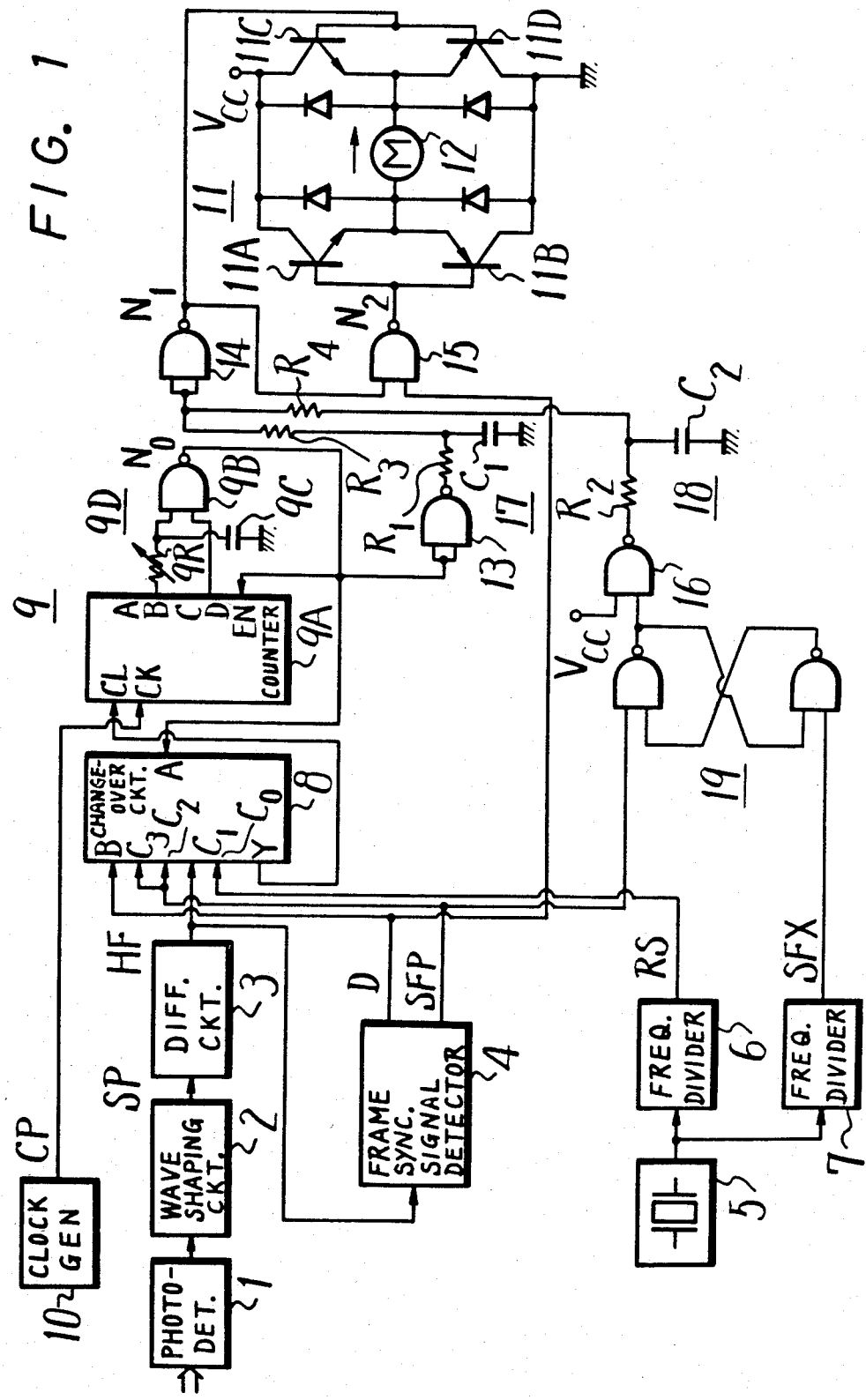

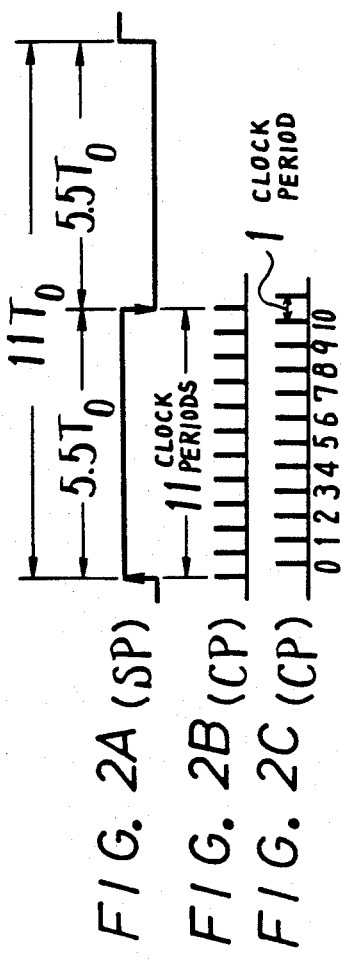
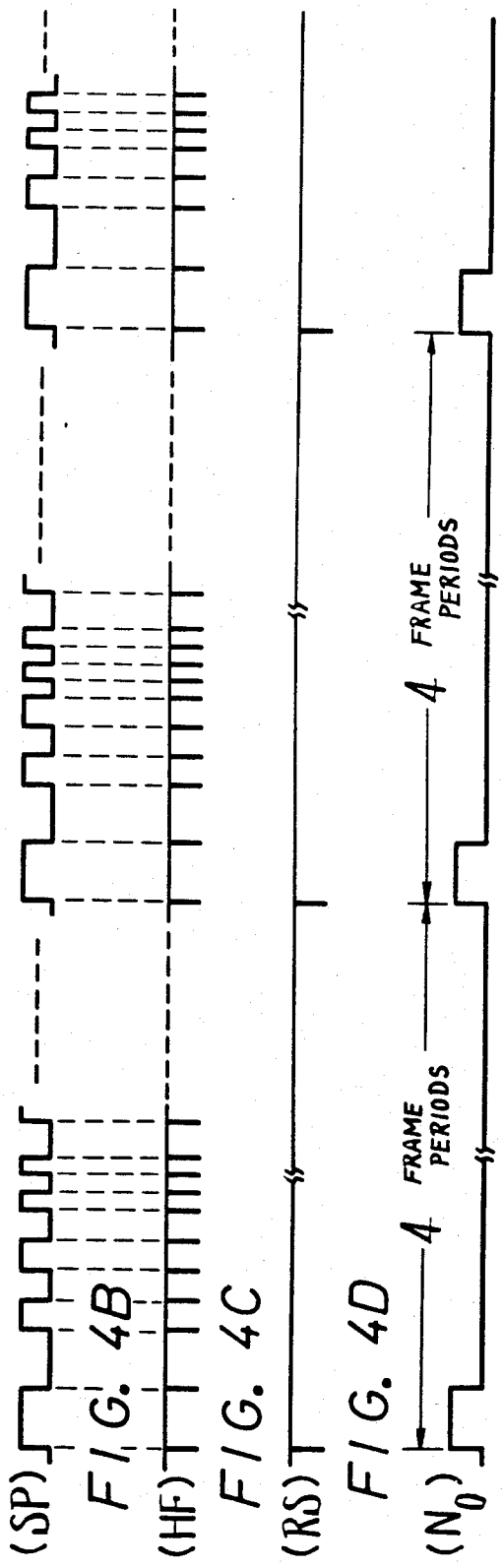

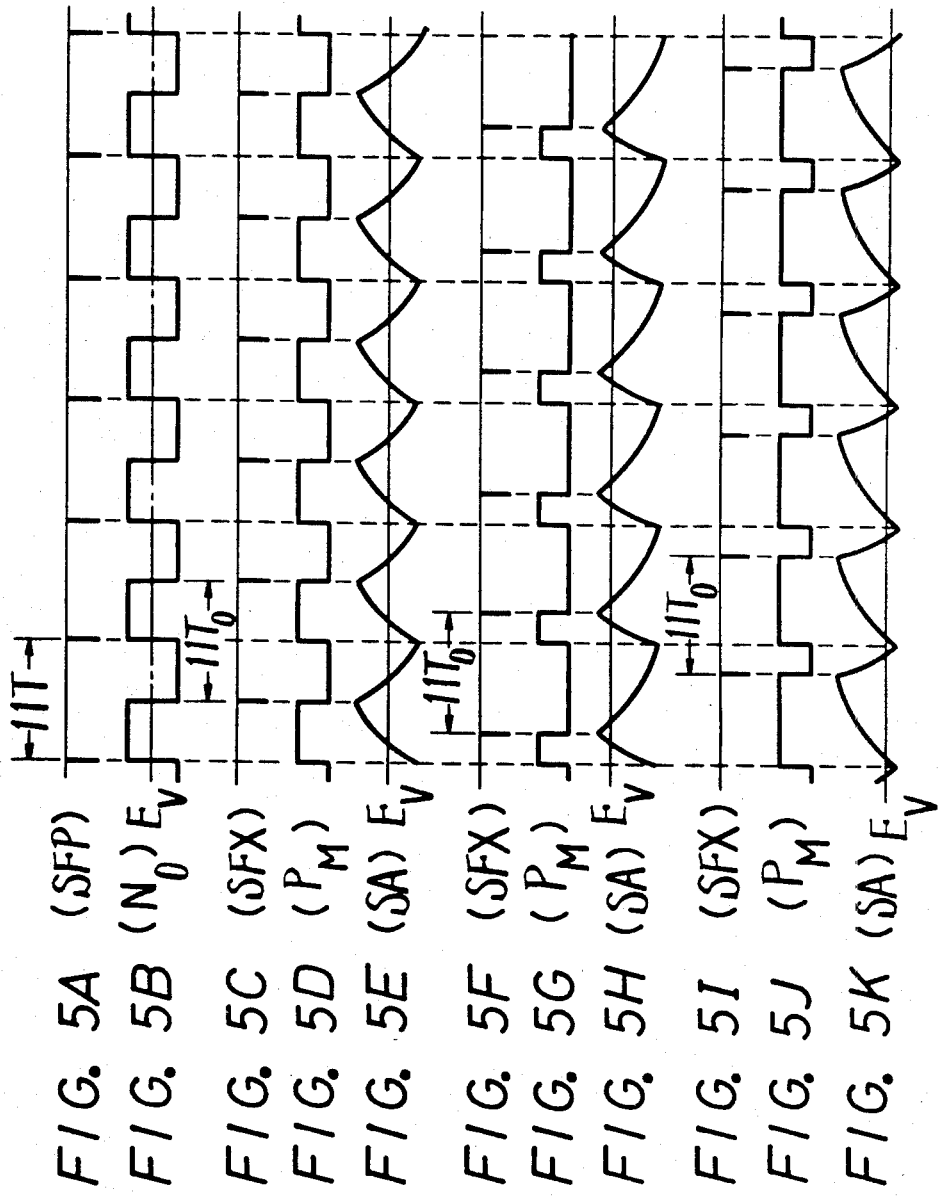

APPARATUS FOR CONTROLLING ROTATION OF A RECORD DISK AT A CONSTANT LINEAR VELOCITY

BACKGROUND OF THE INVENTION

1. Field of the Invention

This invention relates generally to apparatus for reproducing an information signal from a record disc and, more particularly, is directed to apparatus for reproducing a pulse code modulated audio signal from a record disc and using the reproduced signal to control rotation of the disc.

2. Description of the Prior Art

Generally, apparatus of the optical type, electrostatic capacitance type and the like are known in the art for reproducing a pulse code modulated (PCM) audio signal from a record disc, the PCM audio signal generally being recorded on the record disc at a constant angular velocity or at a constant linear velocity. In view of the desire to increase the recording density, recording at a constant linear velocity is preferable and is generally employed. It is therefore to be appreciated that reproduction of the PCM audio signal from the record disc must be performed while the latter is moving at a constant linear velocity.

For controlling rotation of the record disc at the constant linear velocity during the playback mode, it is known to detect the position of a pick-up device by using a potentiometer. Since the number of revolutions is inversely related to the number representing the position of the pick-up device obtained from the potentiometer, the detected output from the potentiometer is fed to a divider circuit to obtain the necessary control information for controlling the disc rotation at the constant linear velocity. However, with such method, the apparatus comprised of the position detector, that is, the potentiometer used for detecting the position of the pick-up device, and the divider circuit, is relatively expensive and complicated in construction.

Accordingly, it has been proposed to control rotation of the record disc at the constant linear velocity by means of the information signal reproduced from the record disc, thereby eliminating the need for a position detector to detect the position of the pick-up device. Before discussing this latter method, it is to be appreciated that, when a PCM audio signal is recorded in the base band, that is, when a PCM audio signal does not utilize a carrier modulation system such as amplitude modulation (AM), frequency modulation (FM) and the like, the PCM audio signal is generally modulated with a run length limited code. Since the PCM audio signal is comprised of a plurality of "0" and "1" bits, a transition interval (T) is defined as the transition between two identical data bits, that is, corresponding to the occurrence of at least one data bit of the "0" or "1" type between two data bits of the other type. In accordance with the run length limited code modulation method, the minimum transition interval $T_{min}$ that can be used is extended or lengthened to increase the efficiency of the recording, while the maximum transition interval $T_{max}$ that can be used is shortened to make the self-clocking characteristic of the signal during the playback mode easier to obtain.

In accordance with the aforementioned method of controlling the rotation of the record disc at the constant linear velocity by use of the reproduced signal therefrom, if the record disc is rotated at a constant linear velocity, the maximum transition interval $T_{max}$ of the reproduced PCM audio signal can be considered as a predetermined reference interval. It is considered that with normal modulation and during normal playback, the reproduced output signal will not include a transition interval greater than the maximum transition interval $T_{max}$, and therefore, the occurrence of an interval which is twice the maximum transition interval $T_{max}$ will certainly not be generated during normal playback. In this regard, a frame synchronizing signal having a length which is exactly twice that of the maximum transition interval $T_{max}$ is added to each frame of data of the PCM audio signal. If it is considered that this frame synchronizing signal appears during each frame of data of the PCM audio signal without fail, any deviation of the maximum transition interval $T_{max}$ from a predetermined reference interval can be easily detected, and rotation of the record disc can be controlled so as to cancel any such deviation and thereby control rotation of the record disc at the constant linear velocity.

It is to be appreciated that, in order to detect any deviation of the maximum (or minimum) transition interval from the predetermined reference interval, it is necessary to detect the length of each of the transition intervals of the PCM audio signal. As one method of detecting the length of each transition interval, it has been proposed to generate a clock pulse signal with a constant frequency higher than the bit frequency of the reproduced PCM audio signal, and then count the number of clock pulses in the maximum transition interval to detect the length thereof. Since the number of clock pulses contained in the maximum transition interval when the record disc is rotated at the constant linear velocity is equal to a predetermined value, rotation of the disc is controlled to make the number of clock pulses contained in the detected maximum transition interval equal to the predetermined value.

Since the frame synchronizing signal has a length in each frame that is twice the maximum transition interval, it is generally considered sufficient to detect such maximum transition interval during each frame period that is, the length of time required to reproduce one frame of data at the constant linear velocity. However, when rotation of the record disc occurs at a velocity which is slower than the constant linear velocity, the period of the frame synchronizing signal reproduced from the record disc becomes longer than one frame interval, that is to say, the frame synchronizing signal is not reproduced during the length of time corresponding to one frame period at the constant linear velocity, so that the maximum transition interval cannot be detected over several frame periods. At such time, if the reproduced audio signal from the record disc includes a continuous pianissimo segment, for example, during a classical music segment, and the minimum transition interval $T_{min}$ is continuous, since the maximum transition interval is detected each frame period, the apparatus may detect the minimum transition interval as the maximum transition interval $T_{max}$. In this situation, rotation of the record disc may be locked to a linear velocity lower than the aforementioned constant linear velocity.

OBJECTS AND SUMMARY OF THE INVENTION

Accordingly, it is an object of this invention to provide apparatus for reproducing an information signal from a record disc which avoids the above-described difficulties encountered with the prior art.

More particularly, it is an object of this invention to provide apparatus for reproducing an information signal from a record disc in which rotation of the record disc is always locked to a constant linear velocity during the playback mode.

It is another object of this invention to provide apparatus for reproducing a pulse code modulated audio signal of a run length limited type from a record disc in which rotation of the record disc is always locked to a constant linear velocity during the playback mode.

It is still another object of this invention to provide apparatus for reproducing a pulse code modulated audio signal from a record disc by means of an optical type signal detection system and in which rotation of the record disc is always locked to a constant linear velocity during the playback mode.

In accordance with an aspect of this invention, apparatus is provided for reproducing from a record medium an information signal of the type including at least one frame of data and at least one transition interval such that maximum and minimum limits are provided for each transition interval and correspond to maximum and minimum transition intervals, and at least one maximum transition interval is provided in each frame of data, the apparatus including transducer means for reproducing the information signal from the record medium during relative movement between the transducer means and the record medium; means for producing an output signal having a bit frequency and corresponding to the reproduced information signal, the output signal having portions of opposite polarities so that the output signal includes at least one transition interval; clock pulse generating means for generating clock pulses having a constant frequency higher than the bit frequency of the output signal; detecting means for detecting the period of at least one transition interval of the output signal by counting the number of clock pulses generated during each detected transition interval of the output signal determining means for determining, during each of at least one predetermined period selected to be longer than the period $$\frac{\text{maximum transition interval}}{\text{minimum transition interval}} \times \text{one frame period},$$

if the number of clock pulses counted by the detecting means during each detected transition interval in each respective longer predetermined period corresponds to a predetermined number of clock pulses included in the maximum transition interval which occurs when the record medium is moving at a predetermined constant velocity, and for producing a velocity control signal in response thereto; and velocity control means for controlling movement of the record medium at the predetermined constant velocity in response to the velocity control signal.

The above, and other, objects, features and advantages of the present invention will become readily apparent to those skilled in the art from the following detailed description thereof which is to be read in connection with the accompanying drawings.

BRIEF DESCRIPTION OF THE DRAWINGS

FIG. 1 is a circuit wiring-block diagram of apparatus according to one embodiment of the present invention for reproducing an information signal from a record disc;

FIGS. 2A–2C are waveform diagrams used to explain the operation of the reproducing apparatus of FIG. 1;

FIG. 3 is a table used to explain the switching states of the change-over circuit in the reproducing apparatus of FIG. 1;

FIGS. 4A–4D are waveform diagrams used to explain the operation of the reproducing apparatus of FIG. 1; and FIGS. 5A–5K are waveform diagrams used to explain the operation of the reproducing apparatus of FIG. 1.

DETAILED DESCRIPTION OF A PREFERRED EMBODIMENT

In accordance with the present invention, in order to prevent the condition in which rotation of the record disc is locked to a constant linear velocity lower than a desired constant linear velocity (hereinafter referred to as the reference linear velocity), that is, when the minimum transition interval $T_{min}$ is misinterpreted as the maximum transition interval $T_{max}$, the length of each frame synchronizing signal in the reproduced PCM audio signal is selected to be at least as great as the maximum transition interval $T_{max}$, even when rotation of the record disc is slower than that at the reference linear velocity. Therefore, the time period for detecting the frame synchronizing signal is selected to be at least as great as one frame period x $(T_{max}/T_{min})$, where a frame period is the length of time required to reproduce one frame of data at the predetermined constant linear velocity. With such arrangement, accurate rotation of the record disc can be controlled to a desired velocity, while preventing the record disc from being locked at a constant linear velocity slower than the reference linear velocity. This is because detection of the maximum transition interval $T_{max}$ can always occur within such period, regardless of the linear velocity of the record disc. Thus, in accordance with the present invention, detection of the maximum transition interval, and the frame synchronizing signal corresponding thereto, occurs during a time period which is greater than one frame period x $(T_{max}/T_{min})$. For illustration purposes only, in accordance with the embodiment of the present invention which will hereinafter be described and where T represents the bit length of input data, the maximum transition interval $T_{max}$ is selected to be 5.5T and the minimum transition interval $T_{min}$ is selected to be 1.5T. Accordingly, the time detection period for the maximum transition interval is selected to be greater than 3.6 (=5.5/1.5) frame periods. In particular, the detection period for the maximum transition interval is selected to be four frame periods.

Referring now to the drawings in detail, and initially to FIG. 1 thereof, apparatus according to one embodiment of the present invention for reproducing a PCM audio signal includes a photo-detector 1 for optically reproducing information from the record disc and which produces a sinusoidal waveform corresponding to the "0" and "1" bits of information recorded on the record disc. The sinusoidal waveform is supplied to a waveform shaping circuit 2 in which the sinusoidal waveform is shaped to form a rectangular waveform which is generated as an output signal SP, as shown in FIG. 4A, having portions of opposite polarities, that is, high or logic level "1" portions and low or logic level "0" portions. In other words, output signal SP is formed of a succession of high and low level transition intervals. Output signal SP is supplied from waveform shaping circuit 2 to a differentiating circuit 3 which produces a pulse signal HF in response thereto, at the leading and trailing edges of output signal SP, the pulses thereof being shown in FIG. 4B as negative pulses for illustration purposes.

Pulse signal HF from differentiating circuit 3 is supplied to a frame synchronizing signal detecting circuit 4 which includes a phase locked loop (PLL) and operates in synchronism with pulse signal HF. Since, as previously discussed, the frame synchronizing signal has a length equal to twice that of the maximum transition interval, such frame synchronizing signal is detected from pulse signal HF on the basis of the signal from the PLL circuit of frame synchronizing signal detecting circuit 4. Since the PLL circuit has a limited lock range, the PLL circuit can lock the rotation of the record disc only when the rotation of such disc occurs at the predetermined reference linear velocity. When the rotation of the record disc deviates from the predetermined reference linear velocity, the frame synchronizing signal is not detected by frame synchronizing signal detecting circuit 4 and a detected output signal D therefrom is at a low level "L". On the other hand, when the record disc is rotated substantially at the predetermined reference linear velocity, the frame synchronizing signal is detected by frame synchronizing signal detecting circuit 4, and the detected output signal D therefrom is at a high level "H". In addition, frame synchronizing signal detecting circuit 4 produces a pulse signal SFP, as shown in FIG. 5A, having a period 11T and which is formed by frequency dividing the signal from the PLL circuit, as will be discussed in greater detail hereinafter.

As shown in FIG. 1, a quartz oscillator 5 supplies an oscillation signal to a frequency divider 6 which, in turn, produces a detection period pulse signal RS, as shown in FIG. 4C, the period of which is equal to the period of detection of the frame synchronizing signal when the record disc is rotated at the predetermined reference linear velocity, that is, is equal to four frame periods. The oscillation signal from oscillator 5 is also supplied to a frequency divider 7 which, in turn, produces a pulse signal SFX having a period $11T_0$, in which $T_0$ represents the bit length of the input data when the record disc is rotated at the reference linear velocity and in which the length of the maximum transition interval is selected to be $5.5T_0$ when the record disc is rotated at the predetermined reference linear velocity, as previously discussed.

A change-over circuit 8 is provided and includes four input terminals $C_0$, $C_1$, $C_2$ and $C_3$ supplied with pulse signal RS, pulse signal HF, pulse signal SFP and pulse signal SFP, respectively. Change-over circuit 8 also includes two selecting terminals A and B supplied with a velocity control output signal $N_0$, which will hereinafter be discussed in greater detail, and the detected output signal D, respectively. The signals supplied to selecting terminals A and B operate to switch one of the four signals supplied to the four input terminals $C_0$, $C_1$, $C_2$ and $C_3$ to the output terminal Y of change-over circuit 8.

The output signal from output terminal Y of change-over circuit 8 is supplied to a clear input terminal CL of a counter 9A of a maximum transition interval detecting circuit 9. Counter 9A also includes a clock input terminal CK supplied with clock pulses CP from a clock pulse generating circuit 10, the clock pulses CP being generated such that 11 clock pulse periods correspond to the maximum transition interval, as shown in FIGS. 2A-2C, when the record disc is rotated at the predetermined reference linear velocity. It is to be appreciated that, when the record disc is rotated at the predetermined reference linear velocity, the maximum transition interval in the reproduced PCM audio signal has a period equal to the reference length $5.5T_0$ and corresponds to a maximum of 12 clock pulses CP, as shown in FIG. 2B. Generally, however, output signal SP and clock pulses CP are rarely in the phase relation shown in FIGS. 2A and 2B, that is, the signals are asynchronous, and are more commonly in the phase relation illustrated in FIGS. 2A and 2C. Accordingly, if the threshold number of the clock pulses to be counted for detection of the maximum transition interval is selected to be 11, the maximum transition interval for such count is equated with the reference interval. It is to be understood, however, that in such situation, the maximum transition interval may be longer than the reference interval $5.5T_0$, which is equated with the 11 clock pulses, by one clock period at maximum, for example, in the situation of FIG. 2B. If the maximum transition interval for a count of 11 is equated with the reference interval $5.5T_0$, and the threshold number of clock pulses CP to be counted is selected to be 10, the period of the maximum transition interval that is detected is shorter than the reference period corresponding to the 11 clock pulses CP by one clock period at maximum.

It is to be appreciated that the clock pulses CP should have a high frequency to provide high detection precision. However, because of the cost and design of the counter, the frequency of the clock pulses cannot be made too high. Thus, in accordance with this invention, the threshold number of clock pulses to be counted for detection of the maximum transition interval is selected to be 10. To obtain accurate timing, however, the last or 10th counted clock pulse CP is delayed approximately one clock period by an inexpensive analog circuit for improving the accuracy of the detection operation. In particular, with the present invention, counter 9A is formed as a four-bit counter. The most significant bit at output terminal D therefrom is supplied to one input terminal of a NAND gate 9B of maximum transition interval detection circuit 9 and the second least significant bit produced at output terminal B thereof is supplied to the other input terminal of NAND gate 9B through a delay circuit 9D comprised of a variable resistor 9R and a capacitor 9C. When counter 9A counts 10 continuous clock pulses CP, signals $Q_B$ and $Q_D$ at output terminals B and D, respectively, both assume a high level "H". However, because of delay circuit 9D, which delays the signal from output terminal B by a delay time corresponding approximately to one clock period, the output $N_0$ of NAND gate 9B assumes a low level "L" corresponding to a time when counter 9A counts an 11th clock pulse CP. With such arrangement, based upon the state of output signal $N_0$ of NAND gate 9B, it can be detected whether the maximum transition interval is longer or shorter than the reference interval. In other words, since detected output signal D assumes a low level "L" when the frame synchronizing signal is not detected by frame synchronizing signal detecting circuit 4, output signal $N_0$ from NAND gate 9B assumes a low level "L" when the maximum transition interval is longer than the reference interval and assumes a high level "H" when the maximum transition interval is shorter than the reference interval. It is to be appreciated that the delay time of delay circuit 9D can be varied by the adjustment of variable resistor 9R to vary the reference interval. Output signal $N_0$ from NAND gate 9B is supplied to an enable terminal EN of counter 9A and also to the selecting terminal A of change-over circuit 8, as will be described in greater detail hereinafter.

As shown in FIG. 1, a driving circuit 11 for a spindle motor 12 used for controlling rotation of the record disc is provided and is controlled by output signal $N_0$ from NAND gate 9B to rotate the record disc at a predetermined reference linear velocity. Driving circuit 11 includes an NPN transistor 11A having its collector connected to a voltage source $+V_{CC}$, its emitter connected to one side of motor 12 and its base supplied with a signal $N_2$ essentially derived from output signal $N_0$ from NAND gate 9B and output signal D. A PNP transistor 11B has its emitter commonly connected with the emitter of transistor 11A, its collector connected to ground and its base commonly connected with the base of transistor 11A. In like manner, at the other side of motor 12, an NPN transistor 11C has its collector connected to voltage supply source $+V_{CC}$, its emitter connected to the other side of motor 12 and its base supplied with a signal $N_1$ essentially derived from output signal $N_0$ from NAND gate 9B. Finally, a PNP transistor 11D has its collector connected to ground and its emitter and base commonly connected with the emitter and base of transistor 11C, respectively.

The circuit of FIG. 1 also includes NAND gates 13, 14, 15 and 16 formed as a single complementary metal oxide semiconductor integrated circuit (CMOS IC) and which are used for supplying the drive signals to driving circuit 11 in response to output signal $N_0$ from NAND gate 9 and detected output signal D. In particular, NAND gate 13 has both input terminals thereof supplied with output signal $N_0$ from NAND gate 9 and thereby functions as an inverter and will hereinafter be referred to as inverter 13. The output signal from inverter 13 is supplied through a low pass filter (LPF) 17 formed of a resistor $R_1$ and a capacitor $C_1$ where it is converted substantially to a direct current voltage and then supplied to both input terminals of NAND gate 14 through a resistor $R_3$. NAND gate 14 thereby functions as an inverter and will hereinafter be referred to as inverter 14. The latter inverter 14 then supplies the output signal $N_1$ to the commonly-connected bases of transistors 11C and 11D of driving circuit 11 and also to one input of NAND gate 15. The other input of NAND gate 15 is supplied with detected output signal D from frame synchronizing signal detecting circuit 4 and, in response to these signals, supplies the output signal $N_2$ to the commonly-connected bases of transistors 11A and 11B of driving circuit 11.

In addition, as will be discussed in greater detail hereinafter, a phase control circuit including an SR flip-flop circuit 19 is provided comprised of two NAND gates, one of the NAND gates having an input terminal which constitutes the set input terminal S of flip-flop circuit 19 and which is set by pulse signal SFP from frame synchronizing signal detecting circuit 4 in synchronism with the reproduced signal, and the other NAND gate having an input terminal which constitutes the reset input terminal R of flip-flop circuit 19 and which is supplied with pulse signal SFX from frequency divider 7. The output signal from flip-flop circuit 19 is supplied to one input of NAND gate 16, the other input thereof being supplied with a voltage from a voltage source $+V_{CC}$. The output signal from NAND gate 16 is supplied through a low pass filter (LPF) 18 comprised of a resistor $R_2$ and a capacitor $C_2$, the time constant of LPF 18 being selected to be appreciably smaller than that of LPF 17. It is appreciated therefore that since the time constant of LPF 17 is relatively large, the product between the time constant of LPF 17 and the mechanical time constant of motor 12 or the time constant at the output of inverter 13, is selected to be relatively large. The output signal from LPF 18 is supplied through a resistor $R_4$ to inverter 14 where it is added to the output signal from LPF 17.

In operation, when the linear velocity of the record disc deviates greatly from the predetermined reference linear velocity, frame synchronizing signal detecting circuit 4 does not detect any frame synchronizing signal, whereby detected output signal D therefrom assumes a low level "L" which is supplied to selecting terminal B of change-over circuit 8. At such time, if output signal $N_0$ from NAND gate 9B is at a high level "H", pulse signal HF from differentiating circuit 3 which is supplied to input terminal $C_1$ of change-over circuit 8 is supplied from output terminal Y thereof, as shown by the table of FIG. 3, to the clear input terminal CL of counter 9A so as to clear counter 9A. Since pulse signal HF produces pulses at the leading and trailing edges of output signal SP from waveform shaping circuit 2, counter 9A counts the number of clock pulses CP supplied to clock input terminal CK thereof during each respective high "H" and low "L" transition interval of output signal SP. If, at such time, counter 9A counts 10 clock pulses CP within a transition interval, both high level output signals $Q_B$ and $Q_D$ from counter 9A are applied to NAND gate 9B at a time when counter 9A counts 11 clock pulses, whereupon output signal $N_0$ assumes a low level "L". It is to be appreciated that, at such time, detected output signal D is at a low level "L" to indicate that the frame synchronizing signal was not detected. Accordingly, when counter 9A counts 10 clock pulses CP, this indicates that the linear velocity of the record disc is slower than the predetermined reference linear velocity, that is, a transition interval less than the maximum transition interval was detected as the maximum transition interval. The slower that the record disc rotates, the smaller the transition interval that may be detected as the maximum transition interval and therefore the sooner that output signal $N_0$ will assume a low level "L". The low level output signal $N_0$ is supplied to the enable terminal EN of counter 9A to stop or inhibit the counting operation thereof so that the output signal $N_0$ remains at its low level "L".

The low level output signal $N_0$ is also supplied to selecting terminal A of change-over circuit 8, whereby the latter change-over circuit 8 supplies pulse signal RS, which is supplied to input terminal $C_0$, from output terminal Y thereof to the clear input terminal CL of counter 9A. Accordingly, output signal $N_0$ remains at its low level "L" until pulse signal RS clears counter 9A. At such time, output signal $N_0$ returns to its high level "H" state and is supplied to selecting terminal A so that change-over circuit 8 again supplies pulse signal HF from input terminal $C_1$ thereof through output terminal Y to clear input terminal CL of counter 9A. It is to be appreciated that pulse signal RS has a length equal to four frame periods, that is, the detection period for the frame synchronizing signal. As a result, the frame synchronizing signal having a length corresponding to the maximum transition interval will always be detected. As previously discussed, the slower that the record disc rotates, the sooner that output signal $N_0$ will assume its low level "L" state, and therefore, the longer the time period that output signal $N_0$ will be in its low level "L" state until pulse signal RS resets counter 9A.

Low level output signal $N_0$, that is, corresponding to the slower rotational speed of the record disc (where the maximum transition interval is longer than the correct maximum transition or reference interval) is supplied, during the remainder of the four frame detecting period through inverter 13 and LPF 17 which, in turn, supplies a high level signal "H" to inverter 14 which again inverts the signal and supplies a low level signal "L" to the commonly-connected bases of transitors 11C and 11D. Output signal $N_1$ from inverter 14 is also supplied to one input of NAND gate 15. Since output signal $N_1$ is at a low level "L", and since detected output signal D is at a low level "L", NAND gate 15 always supplies a high level signal "H" to the commonly-connected bases of transistors 11A and 11B. Accordingly, transistors 11A and 11D are turned ON, while transistors 11B and 11C are maintained in an OFF state. As a result, current flows through motor 12 in the direction shown by the arrow in FIG. 1 to increase the current supplied to motor 12 and thereby accelerate motor 12 in the positive direction to increase the speed of rotation of the record disc.

As the rotational velocity of the record disc is increased by motor 12, the maximum transition interval becomes shorter. If the maximum transition interval becomes shorter than the reference interval, that is, where the record disc rotates at a linear velocity faster than the predetermined reference linear velocity, during the next four frame detection period, no transition interval of output signal SP corresponds to 11 clock pulses CP. Accordingly, no maximum transition interval occurs in the four frame period so that output signal $N_0$ from NAND gate 9B remains in its high level "H" state. At such time, output signal $N_0$ is supplied through inverter 13 and LPF 17 which, in turn, supplies a low level signal "L" to inverter 14. As a result, output signal $N_1$ from inverter 14 is at a high level "H" and is supplied to the commonly-connected bases of transistors 11C and 11D. At such time, since detected output signal D is at low level "L", output signal $N_2$ from NAND gate 15 supplies a high level "H" signal to the commonly-connected bases of transistors 11A and 11B. As a result, transistors 11A and 11C are turned ON, while transistors 11B and 11D are maintained in an OFF state. In this condition, no current flows to motor 12, and therefore, the rotational velocity of the record disc decreases. It should therefore be appreciated that the circuit of FIG. 1 functions to increase the linear velocity of the record disc when the linear velocity is less than the predetermined reference linear velocity and to decrease the linear velocity of the record disc when the linear velocity is greater than the predetermined reference linear velocity, so as to lock the record disc to a constant predetermined reference linear velocity.

It is to be appreciated that, with the above-described circuitry, the phase relation between output signal SP and clock pulses CP is not determined. Thus, the beginning or positive-going edge of the maximum transition interval of output signal SP, as shown in FIG. 2A, may deviate in phase from the clock pulses CP by a maximum of one clock period. In other words, the first clock period CP, indicated by numeral 0 in FIG. 2C may be delayed, for example, with respect to the positive-going or leading edge of output signal SP, shown in FIG. 2A, by a maximum of one clock period. Because of such phase deviation, the last clock pulse CP of the reference number of clock pulses corresponding to the aforementioned reference interval will sometimes enter into the maximum transition interval and at other times escape therefrom. If such last clock pulse CP enters into the maximum transition interval without fail and is thereby counted by counter 9A, output signal $N_0$ from NAND gate 9B will substantially always be in its low level "L" or logic level "0" state, thereby functioning to increase the rotational velocity of motor 12. On the other hand, if such last clock pulse CP escapes from the maximum transition interval and is thereby not counted by counter 9A, output signal $N_0$ will always assumes a high level "H" or logic level "1" state, thereby functioning to decrease the rotation of motor 12. Thus, for example, if the record disc is rotating near the reference linear velocity and the last clock pulse CP enters into the maximum transition interval during the four frame detection period, motor 12 will function to increase the speed of rotation of the record disc. However, during the next four frame detection period, the last clock pulse will not be included in the maximum transition interval so that motor 12 will function to decrease the speed of rotation of the record disc, and so on. In other words, during the state when the record disc is rotating near the reference linear velocity, the last clock pulse CP enters into or escapes from the maximum transition interval substantially for alternate four frame detection periods, whereby output signal $N_0$ alternates between the low level "L" or logic level "0" state and the high level "H" or logic level "1" state alternately for every four frame detection period. In this regard, even without taking into consideration the phase deviation, the last clock pulse of the reference number of clock pulses can be considered to be the end of the maximum transition interval for detection purposes so as to lock the record disc to the reference linear velocity. It is to be appreciated, however, as previously discussed, that the position of the last clock pulse CP with respect to the maximum transition interval can be adjusted easily in an analog manner by delay circuit 9D and, more particularly, by variable resistor 9R thereof, for a maximum delay time of one clock pulse period, so as to adjust the linear velocity of the record disc to more precisely be coincident with the reference linear velocity. It is considered sufficient that adjustment of variable resistor 9R results in the oscillation frequency of the PLL circuit in frame synchronizing signal detecting circuit 4 being synchronized, for example, with the clock component in the reproduced signal for equating the linear velocity of the record disc with the reference linear velocity, whereby frame synchronizing signal detecting circuit 4 can detect the frame synchronizing signal. It is to be appreciated that, with the above embodiment of the invention, since the maximum transition interval is detected every four frame periods in the case where (maximum transition interval/minimum transition interval)=(5.5T/1.5T)<4, the four frame detection period always contains the frame synchronizing signal and the linear velocity of the record disc is locked to the reference linear velocity and never to an erroneous lower linear velocity.

After the record disc is locked to the constant reference linear velocity, as described above, the PLL circuit in frame synchronizing signal detecting circuit 4 is stabily locked to the reproduced signal and the frame synchronizing signal is detected thereby so that detected output signal D from frame synchronizing signal detecting circuit 4 assumes a high level "H" state. Accordingly, since selecting terminal B of change-over circuit 8 is supplied with a high level "H" signal, pulse signal SFP from frame synchronizing signal detecting circuit 4 which is supplied to input terminals $C_2$ and $C_3$ of change-over circuit 8 is supplied from output terminal Y of the latter circuit to the clear input terminal CL of counter 9A, as shown in FIG. 3. It is to be noted from FIG. 3 that pulse signal SFP is supplied to the clear input terminal CL of counter 9A regardless of the level of output signal $N_0$ supplied to selecting terminal A of change-over circuit 8. It is to be remembered that pulse signal SFP, as shown in FIG. 5A, has a period $11T$ formed on the basis of the output of the PLL circuit of frame synchronizing signal detecting circuit 4 and is synchronized with the reproduced signal from the record disc which is rotating at the correct or reference linear velocity.

Accordingly, counter 9A is always cleared by pulse signal SFP and the two input signals supplied to NAND gate 9B both become high "H" after the lapse of the constant reference period $5.5T_0$ since the record disc is rotating at the correct linear velocity. Thus, for the latter half of each interval defined by pulse signal SFP, output signal $N_0$ assumes a low level "L", as shown in FIG. 5B so that output signal $N_0$ has a duty ratio of one-half if the record disc is correctly rotated at the reference linear velocity. If the record disc is rotating at a linear velocity slower than the reference linear velocity, the duty ratio becomes smaller and at a linear velocity higher than the reference linear velocity, the duty ratio thereof becomes larger.

Output signal $N_0$ is supplied through inverter 13 to LPF 17 where it is changed to a direct current signal corresponding to the duty ratio of output signal $N_0$ and then supplied to driving circuit 11 of motor 12 through inverter 14 which functions as a high gain amplifier and through NAND gate 15. As a result, motor 12 is turned ON and OFF at a rate corresponding to the duty ratio of output signal $N_0$ to achieve a velocity servo operation. It is to be appreciated that, since motor 12 generally has a resistance component, the load of motor 12 causes a stationary deviation, that is, error between output signal $N_0$ and the reference interval, to be large, and it thereby becomes difficult to accurately operate motor 12. Accordingly, output signal $N_0$ is integrated by LPF 17, and NAND gates 14 and 15 are operated as high gain amplifiers to reduce the stationary deviation. When the velocity servo operation becomes effective, as described above, the voltage across capacitor $C_1$ in LPF 17 becomes substantially equal to a constant voltage $E_V$.

In addition to the aforementioned velocity servo operation, the present invention also includes a phase servo operation. In particular, SR flip-flop circuit 19 is set by pulse signal SFP from frame synchronizing signal detecting circuit 4 and is reset by pulse signal SFX having a period $11T_0$ from frequency divider 7. Thus, flip-flop circuit 19 produces a signal having a period $11T_0$ and a pulse width which corresponds to the phase difference between pulse signals SFP and SFX, that is, a pulse width modulated (PWM) signal $P_M$. PWM signal $P_M$ is integrated by LPF 18 to produce a sawtooth waveform signal SA.

When the phase difference between pulse signals SFP and SFX is 180°, as shown in FIGS. 5A and 5C, PWM signal $P_M$ has a duty ratio of one-half, as shown in FIG. 5D, so that sawtooth waveform signal SA becomes as shown in FIG. 5E. If the phase difference between signals SFP and SFX is less than 180°, as shown in FIGS. 5A and 5F, the duty ratio of PWM signal $P_M$ is reduced to a value smaller than one-half, as illustrated in FIG. 5G so that sawtooth waveform signal SA becomes as shown in FIG. 5H. On the other hand, when the phase difference between pulse signals SFP and SFX is greater than 180°, as illustrated in FIGS. 5A and 5I, PWM signal $P_M$ has a duty ratio larger than one-half as shown in FIG. 5J, so that sawtooth waveform signal SA becomes as shown in FIG. 5K. Sawtooth waveform signal SA from LPF 18 is added to the velocity servo voltage $E_V$ supplied to inverter 14, and the combined signal, as shown in FIGS. 5E, 5H and 5K, is supplied to driving circuit 11 of motor 12. In other words, motor 12 is controlled by PWM signal $P_M$ modulated in accordance with the phase difference between pulse signals SFP and SFX. It is to be noted that the phase difference between pulse signals SFP and SFX corresponds to the different rotational velocities at the inner and outer peripheries of the record disc even when the linear velocity of the record disc is constant at the reference linear velocity. In the circuit of FIG. 1, the relation between the velocity servo voltage and the phase servo voltage supplied to inverter 14 is controlled by adding resistors $R_3$ and $R_4$, respectively, which are selected to satisfy the relation $R_3 > > R_4$.

As described above, in accordance with the present invention, the detection period of the maximum transition interval is selected to be greater than the time period equal to $(T_{max}/T_{min}) \times$ one frame period so that rotation of the disc is always locked to the predetermined reference linear velocity and never to any other linear velocity.

Having described a specific preferred embodiment of the invention with reference to the accompanying drawings, it is to be understood that the present invention is not limited to that precise embodiment and that various changes and modifications may be made by one skilled in the art without departing from the scope or spirit of the invention as defined in the appended claims herein.

What is claimed is:

1. Apparatus for reproducing from a record medium an information signal of the type including at least one frame of data and at least one transition interval such that maximum and minimum limits are provided for said at least one transition interval and correspond to maximum and minimum transition intervals, and at least one maximum transition interval is provided in each frame of data, said frame of data having a frame period corresponding to the length of time for reproducing said frame of data at a predetermined constant linear velocity, said apparatus comprising:

transducer means for reproducing said information signal from said record medium during relative movement between said transducer means and said record medium;

means for producing an output signal at a bit frequency and corresponding to said reproduced information signal, said output signal having portions of opposite polarities so that said output signal includes at least one transition interval;

clock pulse generating means for generating clock pulses having a constant frequency higher than the bit frequency of said output signal;

detecting means for detecting the length of at least one transition interval of said output signal by counting the number of said clock pulses generated during each detected transition interval of said output signal;

determining means for determining, during each of at least one predetermined period selected to be longer than the period $$\frac{\text{maximum transition interval}}{\text{minimum transition interval}} \times \text{one frame period,}$$

if the number of said clock pulses counted by said detecting means during each detected transition interval in each respective longer predetermined period corresponds to a predetermined number of said clock pulses included in the maximum transition interval which occurs when the record medium is moving at said predetermined constant linear velocity with respect to said transducer means, and for producing a velocity control signal in response thereto; and velocity control means for controlling movement of said record medium at said predetermined constant linear velocity with respect to said transducer means in response to said velocity control signal.

2. Apparatus according to claim 1; in which said detecting means includes counter means for counting the number of said clock pulses generated during each detected transition interval of said output signal.

3. Apparatus according to claim 2; further including differentiating means for differentiating said output signal to produce a differentiated pulse signal and switching means for selectively supplying said differentiated pulse signal to said counter means to clear the count thereof in correspondence with said differentiated pulse signal when said record medium is not moving at said predetermined constant linear velocity with respect to said transducer means, in response to said velocity control signal.

4. Apparatus according to claim 3; further including frame synchronizing signal detecting means for producing a pulse signal having a period determined by said reproduced information signal and for controlling said switching means to supply said pulse signal from said frame synchronizing signal detecting means to said counter means to clear the count of said counter means every two maximum transition intervals, when movement of said record medium is maintained at said predetermined constant linear velocity with respect to said transducer means.

5. Apparatus according to claim 3; further including means for producing a detection period pulse signal having a period longer than the period $$\frac{\text{maximum transition interval}}{\text{minimum transition interval}} \times \text{one frame period,}$$

and in which said switching means is controlled by said velocity control signal when said record medium is not moving at said predetermined constant linear velocity with respect to said transducer means for selectively supplying said detection period pulse signal to said counter means to also clear the count thereof in correspondence with said detection period pulse signal.

6. Apparatus according to claim 5; in which said switching means, in response to said velocity control signal, supplies one of said differentiated signal and said detection period pulse signal to said counter means to clear the count thereof when said record medium is not moving at said predetermined constant linear velocity with respect to said transducer means.

7. Apparatus according to claim 1; in which said determining means includes NAND gate means for determining if the number of said clock pulses counted by said detecting means corresponds to a predetermined number of said clock pulses included in the maximum transition interval when the record medium is moving at said predetermined constant linear velocity with respect to said transducer means and for producing said velocity control signal in response thereto.

8. Apparatus according to claim 1; in which said determining means includes delay means for delaying the production of said velocity control signal by approximately one clock period from the time when said detecting means counts said predetermined number of clock pulses generated during a detected transition interval.

9. Apparatus according to claim 1; in which said record medium is a record disc and said velocity control means controls rotation of said record disc at said predetermined constant linear velocity with respect to said transducer means in response to said velocity control signal.

10. Apparatus according to claim 1; further including frame synchronizing signal detecting means for detecting if a maximum transition interval in said predetermined longer period corresponds to a reference maximum transition interval which occurs when said record medium is moving at said predetermined constant linear velocity with respect to said transducer means and for producing a detected output signal in response thereto, and in which said velocity control means controls movement of said record medium at said predetermined constant linear velocity with respect to said transducer means in response to said velocity control signal and said detected output signal.

11. Apparatus according to claim 1; further including phase control means for controlling movement of said record medium in response to a phase difference between a pulse signal having a period and phase in synchronism with the reproduced information signal and a reference pulse signal having a reference period and a reference phase, when said record medium is moving at said predetermined constant velocity.

12. Apparatus according to claim 11; in which said phase control means includes frame synchronizing signal detecting means for generating said pulse signal having said period and phase in synchronism with the reproduced information signal, reference pulse generating means for generating said reference pulse signal; and flip-flop means having a set input terminal supplied with said pulse signal from said frame synchronizing signal detecting means, a reset input terminal supplied with said reference pulse signal, and producing an output signal for controlling movement of said record medium in response to said phase difference, when said record medium is moving at said predetermined constant velocity.

* * * * *